United States Patent [19]

Alonso

[11] 4,108,035

[45] Aug. 22, 1978

[54] MUSICAL NOTE OSCILLATOR

[76] Inventor: Sydney A. Alonso, Strafford, Vt. 05072

[21] Appl. No.: 803,535

[22] Filed: Jun. 6, 1977

[51] Int. Cl.[2] .................................................. G01F 1/00

[52] U.S. Cl. ...................................... 84/1.01; 84/1.03; 84/DIG. 7

[58] Field of Search .................. 84/1.01, 1.03, DIG. 7

[56] References Cited

U.S. PATENT DOCUMENTS

| | | | |
|---|---|---|---|
| 3,626,350 | 12/1971 | Suzuki | 84/DIG. 7 |
| 4,023,454 | 5/1977 | Obayashi | 84/1.01 |
| 4,043,240 | 8/1977 | Ando | 84/1.01 |

*Primary Examiner*—B. Dobeck
*Assistant Examiner*—William L. Feeney

[57] ABSTRACT

The disclosure describes an improved digital oscillator for use in an electronic musical system capable of converting electrical tone signals into corresponding sound waves. The oscillator includes an adder, accumulator and multiplexer for selectively transmitting either a divisor number or increment number to the adder. The oscillator cyclically performs incrementing operations by using the increment number over a variable range established by the divisor number at the beginning of each cycle. When the modulus of the adder is exceeded, the adder generates a carry pulse and a remainder. The divisor is then added to the remainder before the incrementing operations begin again. A digital calculator automatically calculates the proper values of the increment and divisor numbers so that the carry pulses occur at a predetermined frequency.

24 Claims, 7 Drawing Figures

MUSICAL NOTE OSCILLATOR

BACKGROUND AND SUMMARY OF THE INVENTION

This invention relates to electronic musical instruments, and more particularly relates to such instruments in which the frequency of the resulting notes can be widely varied over small increments.

Due to its advantages in reliability, size and price, designers of electronic musical instruments increasingly have sought to employ digital circuitry in order to generate musical notes. Many of the resulting instruments are electronic organs which produce fundamental tones ranging from C1 having a frequency of about 32 Hz. to C8 having a frequency of about 4,096 Hz. Although the human ear is capable of distinguishing several thousand frequencies within the range from C1 to C8, electronic organ-type musical instruments are designed to synthesize only about 85 distinct frequencies within this range.

At least two different techniques have been employed to generate the required frequencies. According to the first technique, a top octave synthesizer employs a high-frequency oscillator and a series of dividers in order to generate the twelve chromatic tones in the top octave of the instrument (e.g., C7 to C8). The remaining tones are then produced by dividing the twelve outputs of the top octave synthesizer by an integer power of two. The pulses produced by the divider networks then are shaped by filters or other analog circuits in order to produce a sound of a desired characteristic or timbre.

The second technique requires the storage of a complex waveform in a digital memory and the sampling of the waveform according to the frequency of the desired note. One example of this technique is described in U.S. Pat. No. 3,515,792 (Deutsch-June 2, 1970). According to the Deutsch Patent, the digital memory is sampled by a ring counter which receives its input from a conventional top octave synthesizer.

According to U.S. Pat. No. 3,743,755 (Watson-July 3, 1973), a digital memory storing a complex waveform also can be sampled by an address decoder which decodes the number stored in a sample point address register. The sample point address register is advanced by a predetermined phase angle increment upon the receipt of each clock pulse. By varying the value of the phase angle increment, the memory is addressed at a faster or slower rate.

Although both of the foregoing techniques are adequate for the synthesis of tones in keyboard instruments which require only a few frequencies, they are not acceptable for generating a large number of frequencies from C1 to C8 where the increment between the frequencies is small (e.g., 0.5 Hz.). In order to produce frequencies over a wide range in small increments, the foregoing techniques would require either extremely large registers and counters or unrealistically high clock rates. For example, in order to achieve results similar to those obtained from the embodiment described in this document, conventional techniques would require approximately 10-bit counters and a 32 megahertz clock rate.

Although keyboard instruments are not called upon to produce a large number of frequencies over their range, other instruments, such as violins, are capable of producing a nearly infinite number of discrete frequencies within their range. In order to produce the variable frequency characteristics of these instruments, it is important to have a note oscillator capable of generating frequencies over a wide range in narrow, controllable intervals. In addition, such a capability is important in electronic musical synthesizers in order to provide added interest to the sound being produced.

Of course, frequencies can be varied over large ranges through small increments by the use of analog circuitry. However, this approach is undesirable because of the inherent instability and high cost of analog circuitry compared to digital circuitry.

Accordingly, it is the primary object of the present invention to provide a digital technique for producing pulses over a wide range of repetition rates in small, predetermined, controllable increments.

Another object is to provide a digital note oscillator for producing pulses having frequencies which extend throughout one octave and which can be set to a large number of frequencies within the octave.

Still another object of the present invention is to provide a note oscillator of the foregoing type which is capable of cyclically performing incrementing operations over a variable range at a variable increment and for generating a carry pulse and a remainder when the range is exceeded, and for readjusting the range in proportion to the remainder in response to each carry pulse.

Still another object of the present invention is to provide a note oscillator of the foregoing type in combination with a digital calculator for automatically calculating the proper values of the range and increment so that the repetition rate of the oscillator is set at a desired value.

It has been discovered that the foregoing objects can be achieved by the use of relatively inexpensive digital circuitry arranged according to the techniques described hereafter. By the use of this circuitry, note pulses can be produced over a wide range of frequency in small increments without employing high-frequency oscillators, large memories or large registers.

DESCRIPTION OF THE DRAWINGS

These and other objects, advantages and features of the present invention will hereinafter appear in connection with the accompanying drawings wherein like numbers refer to like parts throughout and wherein.

DESCRIPTION OF THE PREFERRED EMBODIMENT

Figure 1:
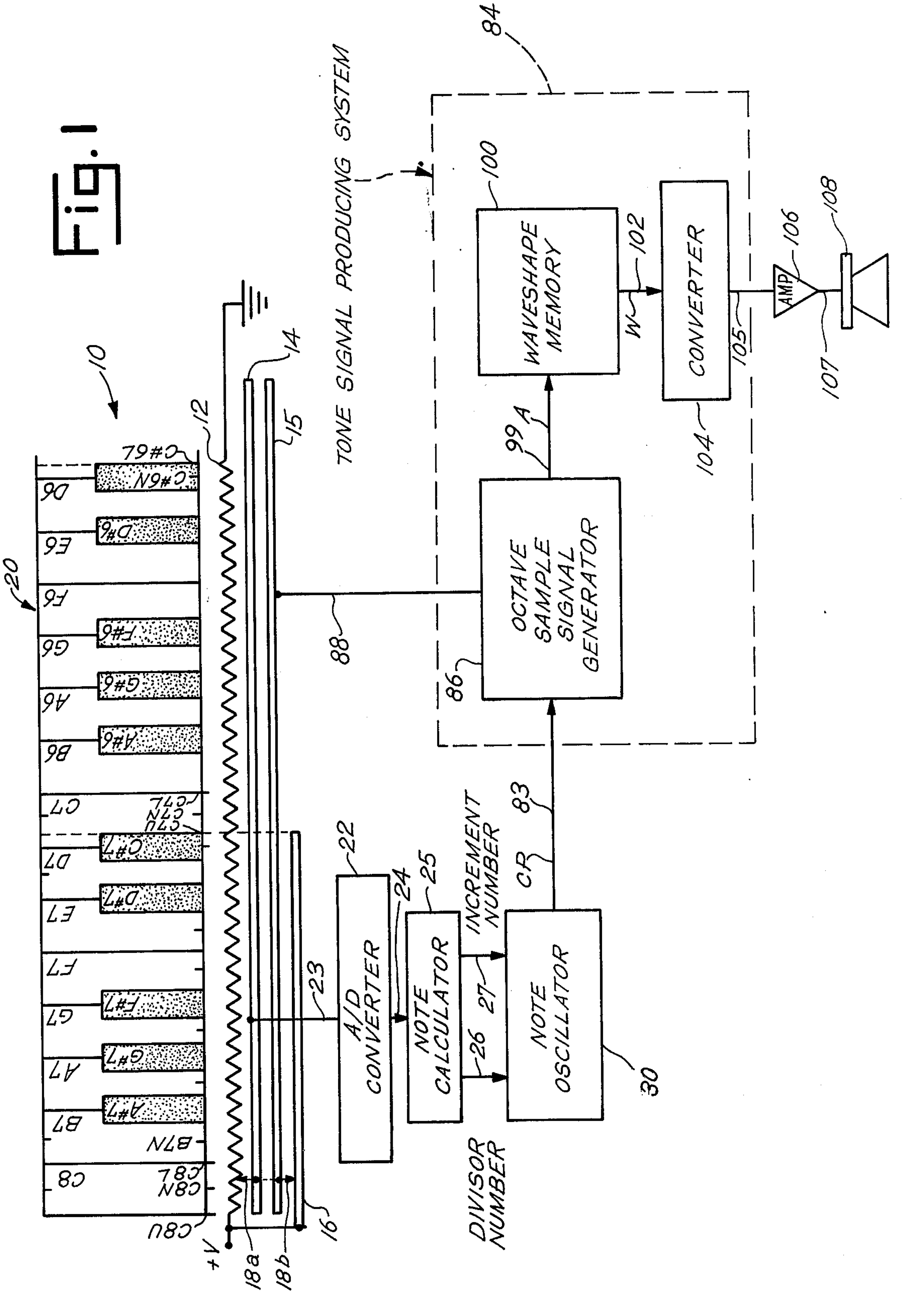
FIG. 1 is a system block diagram of a preferred form of an electronic musical system made in accordance with the present invention.

Referring to FIG. 1, an electronic musical system employing a preferred embodiment of the invention basically comprises an input system 10, a note oscillator 30, a tone signal producing system 84, and an output system for converting the tone signals to audible sound waves, including an amplifier 106 which is connected to a loudspeaker transducer 108 through a conductor 107.

More specifically, referring to FIG. 1, input system 10 includes a potentiometer 12 which is connected between a source of positive DC voltage V and ground potential. Conductive rods 14, 15 and 16 are positioned parallel to potentiometer 12. A slider 18*a* provides a conductive path between potentiometer 12 and rod 14, and a slider 18*b* provides a conductive path between rods 15 and 16. Sliders 18*a* and 18*b* are ganged together and can be manually slid along the entire length of rods 14 and 15. In addition, slider 18*a* can be retracted out of contact with rod 14 while it is being moved in order to provide a period of silence between the production of notes. As a result, the voltage on rod 14 varies between +V and ground potential depending on the position of slider 18*a*. The position of slider 18*b* results in a digital signal on rod 15 which is either at +V or zero volts.

Input system 10 also comprises a playing guide 20 which takes the form of a keyboard extending from C8 (the highest note of a conventional piano) to C#6. The keyboard is located over potentiometer 12 in the position shown so that a performer is able to judge the approximate pitch or frequency of a resulting soundwave corresponding to any position of the slider.

Still referring to FIG. 1, input system 10 also includes an analog-to-digital (A-to-D) converter 22 which receives the voltage from slider 18*a* over a conductor 23 and converts it into a corresponding digital number. The digital number, in turn, corresponds to the frequency of the note desired to be synthesized by the performer. For example, if the fundamental frequency of C8 corresponds to 4,096 Hz. and C#6 corresponds to 1,084 Hz., A-to-D converter 22 is capable of generating digital numbers over the nearly two octave span corresponding to the range from C8 to C#6, including each of the thousands of frequencies located within the span.

The output of A-to-D converter 22 is conducted over an 8-bit data line 24 to a note calculator 25. The note calculator automatically calculates an 8-bit divisor number and 4-bit increment number according to principles described later. The divisor and increment numbers are transmitted over an 8-bit data line 26 and a 4-bit data line 27, respectively, to note oscillator 30. By adjusting the values of the divisor and increment numbers, the note calculator 30 is able to alter the frequency of the carry pulses (CP) produced by note oscillator 30.

Figure 2:
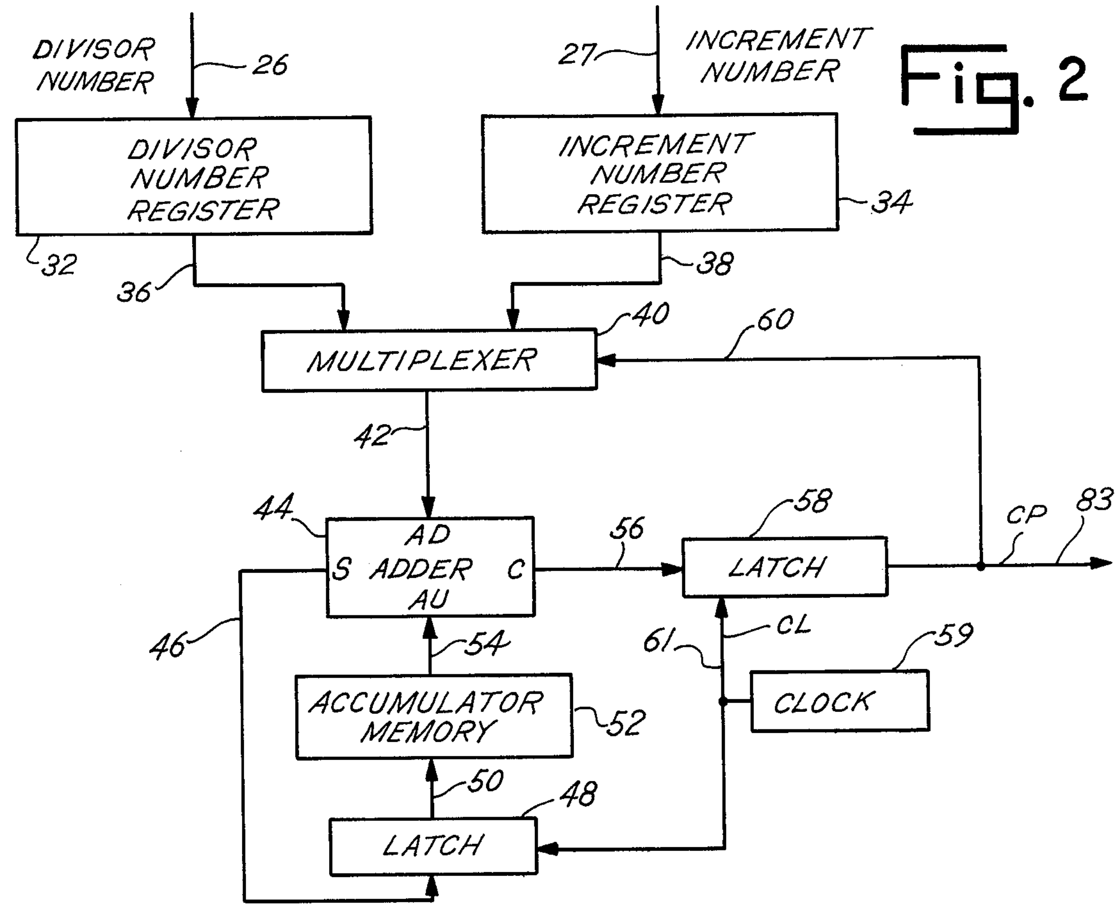
FIG. 2 is an electrical schematic diagram of one preferred form of the note oscillator shown in FIG. 1.

Referring to FIG. 2, a preferred form of note oscillator 30 comprises an 8-bit divisor number register 32 for storing the divisor number and a 4-bit increment number register 34 for storing the increment number. Thus, the maxium number of integers which can be represented in binary coding by the divisor and increment number registers is 256 and 16, respectively. The divisor and increment numbers are transmitted over an 8-bit data line 36 and a 4-bit data line 38, respectively, to a conventional multiplexer 40 which performs a gating function. In response to the receipt of appropriate signal levels on conductor 60, multiplexer 40 enables either the divisor number or increment number to be transmitted over an 8-bit data line 42 to an 8-bit adder 44 having a modulus of 8 bits. It has been discovered that suitably narrow pitch intervals over a wide range of frequencies can be produced even though the divisor number is limited to 256 and the integer number is limited to 16.

The adder performs addition operations to form sums and also generates a carry pulse with a remainder when the results of any addition operation exceeds the modulus. More specifically, the adder has an augend input AU and an addend input AD which receive two 8-bit numbers to be added together. The sum of the numbers appears on the S output and is transmitted over an 8-bit data line 46 to an 8-bit latch 48. The latch, in turn, transmits the sum over an 8-bit data line 50 to an 8-bit accumulator 52. The accumulator stores the sum until the next addition operation takes place. At this point in time, the accumulator transmits the 8-bit sum over an 8-bit data line 54.

When the modulus of the adder is exceeded, a carry pulse (CP) is generated at the C output of the adder and is transmitted over a 1-bit data line 56 to a 1-bit latch 58. The signal, in turn, is transmitted over conductor 60 in order to control the operation of multiplexer 40 and is transmitted over a conductor 83 to tone signal producing system 84. If a carry pulse is stored, the divisor number from register 32, rather than the increment number from register 34 is transmitted through multiplexer 40 to adder 44.

The operation of the note oscillator is controlled by a 400 kilohertz clock 59 and a clock line 61 which transmits clock pulses CL. When each clock pulse is at its 0 logic level, adder 44 performs the calculations described above. When the clock pulse switches to its 1 logic level, the sums and carry pulse results are stored in latches 48 and 58. Then the sum can be written into accumulator memory 52 in preparation for another cycle of operation.

Figure 3:
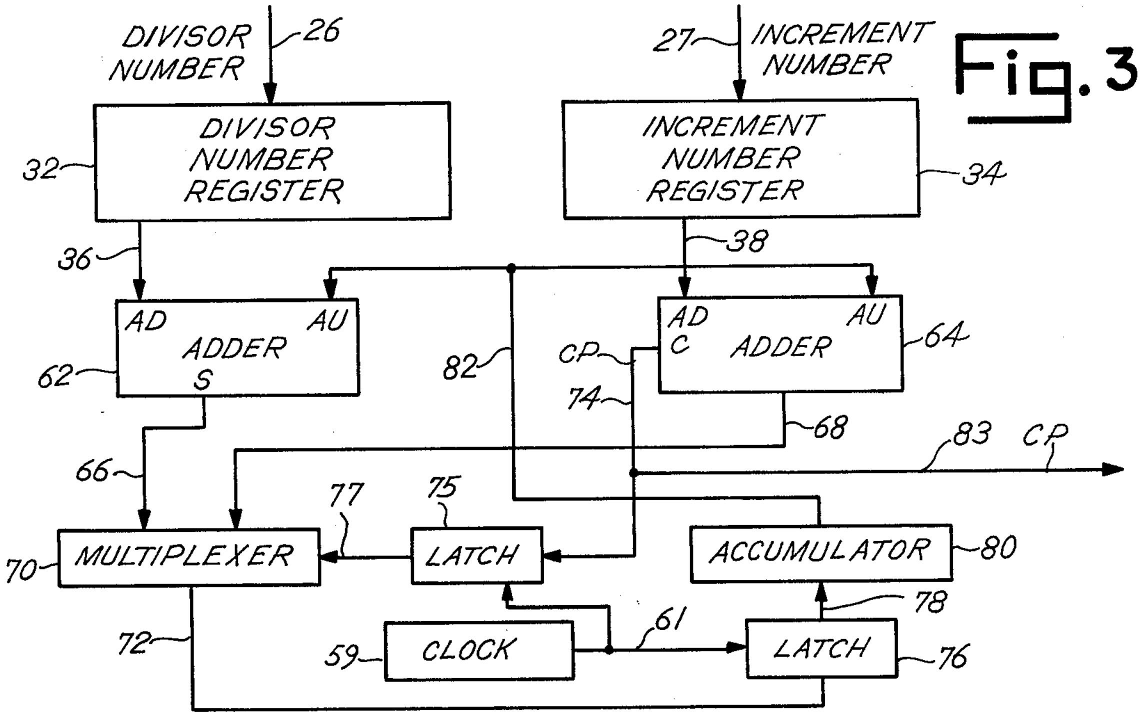
FIG. 3 is an electrical schematic diagram of an alternative form of the note oscillator shown in FIG. 1.

An alternative embodiment of note oscillator 30 is illustrated in FIG. 3. The FIG. 3 embodiment retains registers 32 and 34 as well as data lines 26, 27, 36 and 38 illustrated in FIG. 2. However, the FIG. 3 embodiment includes two identical 8-bit adders 62 and 64 which are like adder 44. The sums produced by the adders are transmitted over 8-bit data lines 66 and 68 to a multiplexer 70. In response to control signals transmitted over conductor 74, stored in latch 75 and transmitted over conductor 77, the multiplexer allows either the sum from adder 62 or the sum from adder 64 to be transmitted over an 8-bit data line 72 to an 8-bit latch 76. The latch, in turn, transmits the sum over an 8-bit data line 78 to an 8-bit accumulator 80. At the appropriate time, the sum is transmitted from accumulator 80 over an 8-bit data line 82 to the AU inputs of adders 62 and 64. As in the case of the FIG. 2 embodiment, the carry pulse from adder 64 is transmitted over conductor 83 to the tone signal producing system 84. The carry pulse also is stored in latch 75 in order to control multiplexer 70. If a carry pulse is stored, the sum from adder 62 is transmitted to latch 76, rather than the sum from adder 64.

Tone signal producing system 84 (FIG. 1) converts the carry pulses of oscillator 30 into tone pulses corresponding to the sound to be synthesized. If oscillator 30 is used in a conventional electronic organ, system 84 may include a conventional binary dividing circuit to produce a note in the proper octave, and may include appropriate filters and shaping circuitry in order to produce electrical tone signals having the appropriate harmonic content to produce the desired timbre of sound. Alternatively, the oscillator 30 may be used in connection with a tone signal producing system employing a digital memory, such as memory 100. The digital memory stores a digital representation of a complex waveform representing the desired harmonics. The memory is addressed at a rate corresponding to the frequency of the desired tone in order to produce the tone signals. A waveshape memory of this type is fully described in U.S. Pat. No. 3,515,792 (Deutsch-June 2, 1970).

Figure 4:
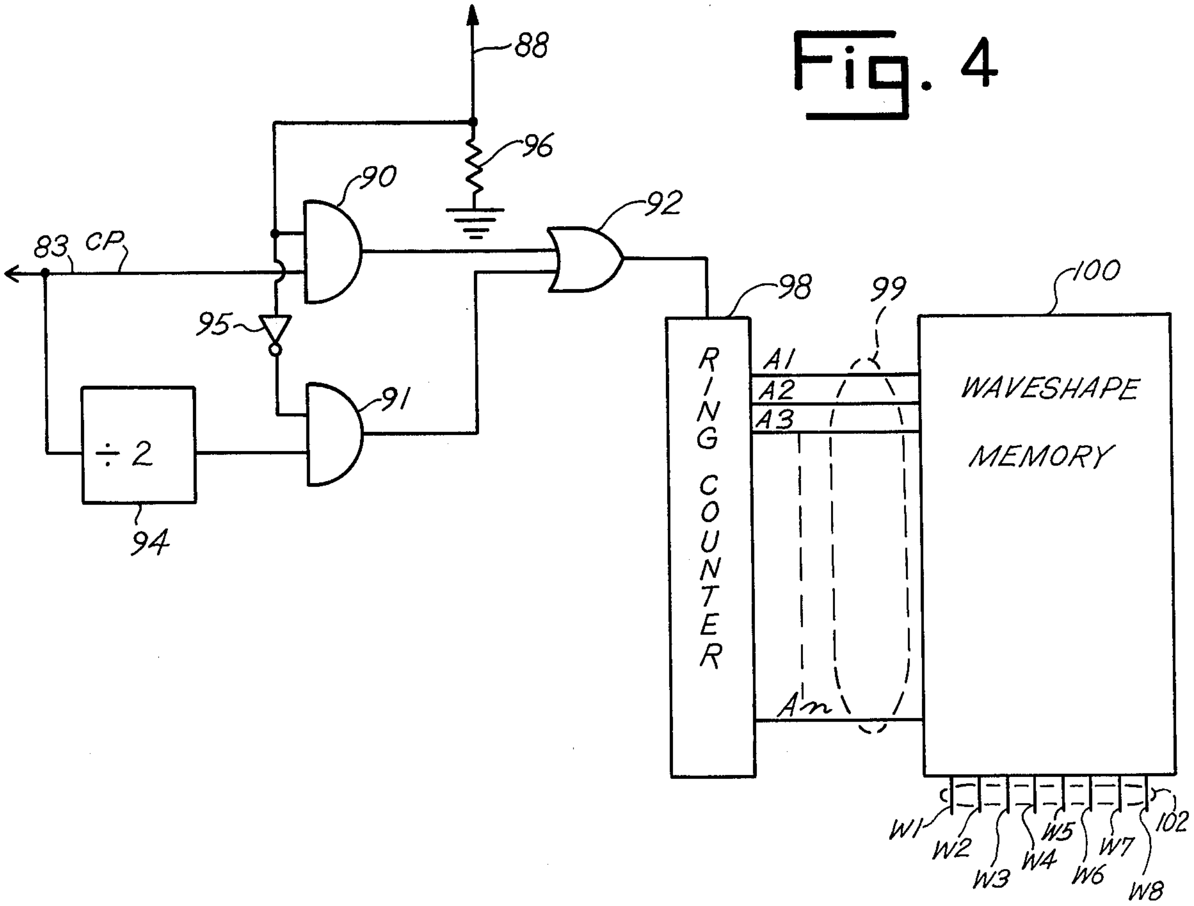
FIG. 4 is an electrical schematic drawing of an exemplary form of an octave sample signal generator useful in connection with the present invention.

As explained in the Deutsch Patent, memory 100 can be addressed by an octave sample signal generator of the type shown in FIG. 4. The generator includes an input conductor 88 which is connected to rod 15 in order to receive a digital signal from wiper 18*b* (FIG. 1). In addition, generator 86 includes AND gates 90, 91, an OR gate 92, a divide-by-two flip-flop 94, an inverter 95 and a resistor 96. The output of OR gate 92 advances a conventional ring counter 98 having addressing outputs A1–An connected to a multibit data line 99. As explained in the Deutsch Patent, waveshape memory 100 stores an 8-bit digital word (i.e., W1–W8) at 48 different sample points. The sample points are addressed by the 48 different outputs of ring counter 98 in order to read the words onto an 8bit data line 102. If the embodiment shown in the Deutsch Patent is employed, the ring counter will have outputs A1–A48.

Note oscillator 30 produces CP pulses having a repetition rate equal to N*f*, where *f* is the frequency of the desired tone signal and N is the number of sample points stored in the waveshape memory for a complete cycle of the tone. In the present example, N equals 48. In order to produce a tone corresponding to C8, note oscillator 30 produces CP pulses at the rate of N times *f* (i.e., 48 times 4,096) or 196,608 Hz. Since sliders 18*a* and 18*b* are positioned adjacent the C8 portion of guide 20 at this time, rod 15 transmits a logical one signal (corresponding to voltage +V) over conductor 88 to AND gates 90, 91. As a result, the carry pulses from conductor 83 are conducted directly to ring counter 98 through gates 90, 92. Ring counter 98 addresses all 48 sample points in the memory 4,096 times during each second in order to produce a series of digital words corresponding to a tone signal (C8) having a frequency of 4,096 Hz. The same procedure is used for reproducing all tone signals approximately in the range of C8 to C#7.

As soon as sliders 18*a*, 18*b* are moved to the portion of guide 20 corresponding to C7 through C#6, wiper 18*b* does not receive a voltage from rod 16, and a logical zero signal is transmitted over conductor 88 to AND gates 90, 91 (FIG. 4). As a result, the carry pulses from note oscillator 30 are transmitted through divide-by-two circuit 94 in order to cause ring counter 98 to address memory 100 at one-half the usual rate. As a result, the digital words are read out of the memory at one-half the rate employed to reproduce the tone signals corresponding to the top octave C8–C#7.

The digital words read out of memory 100 are converted to electronic tone signals by a conventional converter 104 (FIG. 1). As explained in the Deutsch Patent, converter 104 can include attack and decay control circuitry, as well as summing means and a digital-to-analog converter. The analog tone signals produced on conductor 105 are amplified by a conventional amplifier 106 and transmitted to a conventional loudspeaker 108 over a conductor 107.

Alternatively, tone signal producing system 84 may be designed in accordance with the copending application, Ser. No. 804,363, entitled "Electronic Music Sampling Techniques", filed contemporaneously with this application by the same applicant.

Note calculator 25 and note oscillator 30 operate in the following manner.

The music synthesizing system described in FIG. 1 is designed to produce a variety of notes having fundamental frequencies lying in the range of about 1,054 to 4,218 Hz. This corresponds approximately to the notes C#6–C8 on a piano keyboard. The nominal frequency of C8 is about 4,096 Hz., but the system is capable of generating notes having fundamentals up to about 4,218 Hz. Likewise, the nominal frequency of C#6 is about 1,084 Hz., although the system is able to produce notes having a fundamental frequency down to about 1,054 Hz. A-to-D converter 22 is calibrated so that the fundamental frequencies of the notes shown on guide 20 are produced when slider 18*a* is positioned in the middle of those notes. For example, when the slider is moved to position C8N, A-to-D converter 22 produces a binary number corresponding to 4,096 (the fundamental frequency of note C8); when the slider is moved to position B7N, converter 22 is calibrated to produce a binary number corresponding to about 3,866 Hz. (the fundamental frequency of note B7); when slider 18*a* is moved to position C7N, converter 22 is calibrated to produce a binary number ocrresponding to 2,048 Hz. (the fundamental frequency of note C7); when the slider is moved to prosition C#6N, converter 22 is calibrated to produce a binary number corresponding to 1,084 (the fundamental frequency of note C#6).

In addition to producing binary numbers corresponding to the nominal fundamental frequencies of the notes shown on guide 20, converter 22 also can produce numbers corresponding to all the frequencies between the nominal scale frequencies. For example, when slider 18*a* is moved to position C8U, A-to-D converter produces a binary number corresponding to 4,218 Hz., and when slider 18*a* is moved to position C8L, the A-to-D converter 22 is calibrated to produce a binary number corresponding to 3,981 Hz. Likewise, when slider 18*a* is moved to position C7U, converter 22 is calibrated to produce a binary number corresponding to 2,109 Hz., (one-half the frequency of the uppermost number which can be generated by the A-to-D converter). In summary, by moving slider 18*a* along guide 20, the performer can cause converter 22 to produce numbers in the range 1,054–4,218 which correspond to the fundamental frequencies of the chromatic notes shown on guide 20, as well as all of the frequencies between those notes. Thus, the performer can make the system produce a note which is "flat" or "sharp" compared to the equally-tempered scale frequencies corresponding to the notes shown on guide 20.

Figure 5:
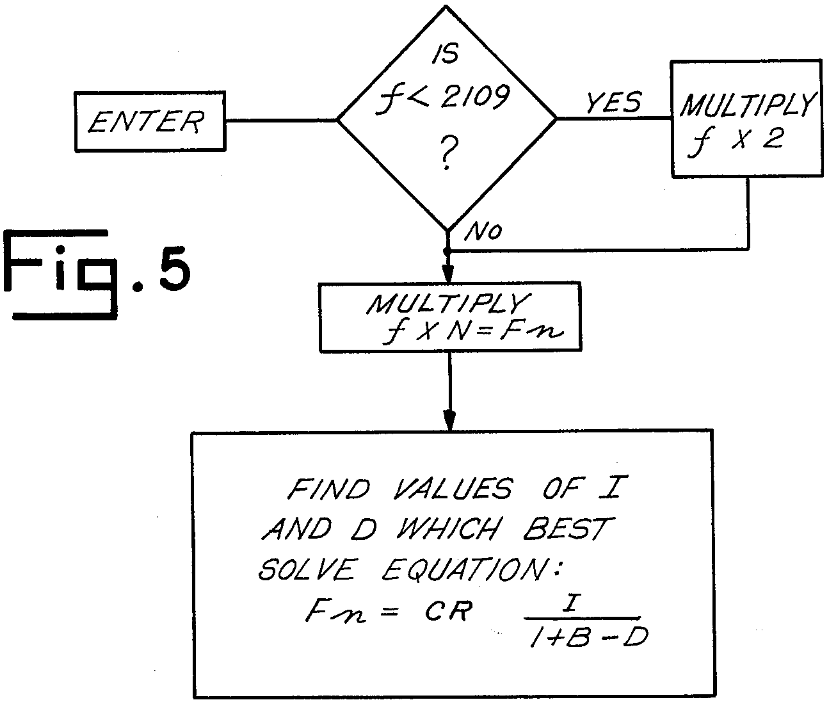
FIG. 5 is a flow diagram of a preferred form of program performed by the note calculator shown in FIG. 1.

Referring to FIG. 5, note calculator 25 may be a conventional electronic digital data processor capable of performing arithmetic operations. In general, the calculator solves an equation to determine the proper numbers to be entered into the divisor and increment number registers 32 an 34 (FIG. 2). As shown in FIG. 5, the calculator first determines whether the number (*f*) transmitted by converter 22 is less than 2,109 (i.e., whether the slider is in the top octave from C#7–C8 or the lower octave from C#6–C7). If *f* is less than 2,109 (i.e., the slider is in the lower octave), the calculator multiplies *f* by 2. The calculator then multiplies f by the number N of sample points in memory 100 in order to form Fn. In this example, N = 48. The calculator then finds the values of I and D which best solve the equation $Fn = CR\ [I/(1+B-D)]$. In the example given in FIG. 2, CR equals the repetition rate of the clock 59 or 400K Hz., and B equals the modulus of adder 44 = $2^8$ = 256. I is the increment number and D is the divisor number. The equation is solved for the pair of I and D values which most nearly approximates the value of Fn. In the present example, D ranges between zero and 255 and I ranges between zero and 15. However, other values of I and D can be selected depending upon the degree of accuracy desired. Once the proper values of D and I have been selected, they are loaded into registers 32 and 34, respectively. One program written in the Basic computer language which the calculator can use to solve the foregoing equations is shown in Table I:

TABLE I

```
10   FOR J = 0 to 10
11   LET P9 = 155 + (J/10)
12   PRINT "CLOCK PERIOD = ",P9, "NANOSEC."
14   LET P9=P9*1 E-9
20   LET F9 = (1/P9)/16
30   '
40   ' F9 IS PER CHAN. SAMP RATE
50   '
60   PP.INT "PER CHANNEL SAMPLE RATE IS"; F9; "HZ."
70   PRINT
80   '
100  PRINT" FREQ NEAREST ERROR DIVISOR INCREM
110  PRINT
120  '
190  LET E6 = 0
200  FOR I = 0 TO 12
210  LET R = 22 (I/12)
220  ' R IS THE RATIO OF SUCCESIVE TONES IN TEMPERED SCALE
240  '
250  LET F1=246.9419*R
260  ' F1 IS THE DESIRED FREQ
270  LET F2 = F1*128
280  ' F2 IS SAMPLE RATE > 32 KHZ FOR F1
285  '
290  LET E = 10000' ASSUME A LARGE ERROR INITIALLY
300  FOR S = 1 to 16
320  FOR D = S to 256
330  ' D IS DIVISOR, S IS INCREMENT
340  LET F3 = F9*S/(D+S)
350  LET E9 = ABS (F2-F3)
360  IF E9 < E THEN 400
370  GO TO 500
400  ' RECORD A BETTER APPROX
410  LET D9 = D
420  LET S9 = S
430  LET E = E9
500  NEXT D
510  NEXT S
600  LET F7 = F9*S9/(D9 + S9)/128
610  LET E5 = F7-F1
620  LET E6 = E6 + (E5*E5)
630  PRINT F1,F7,E5,D9,S9
700  NEXT I
800  PRINT
810  PRINT " THE SUM OF THE SQUARED ERRORS IS",E6
900  FOR I = 1 TO 25
910  PRINT
920  NEXT I
930  NEXT J
9999 END
```

Referring to FIG. 2, after the divisor and increment numbers are loaded into registers 32 and 34, the note oscillator cyclically performs incrementing operations over a variable range at a variable increment and generates a carry pulse and a remainder when the range is exceeded. The oscillator readjusts the range in proportion to the remainder in response to each carry pulse, and the incrementing operations are begun again on a cyclical basis. The specific manner in which the note oscillator of FIG. 2 accomplishes this mode of operation is illustrated in connection with FIGS. 6 and 7.

Figure 6:
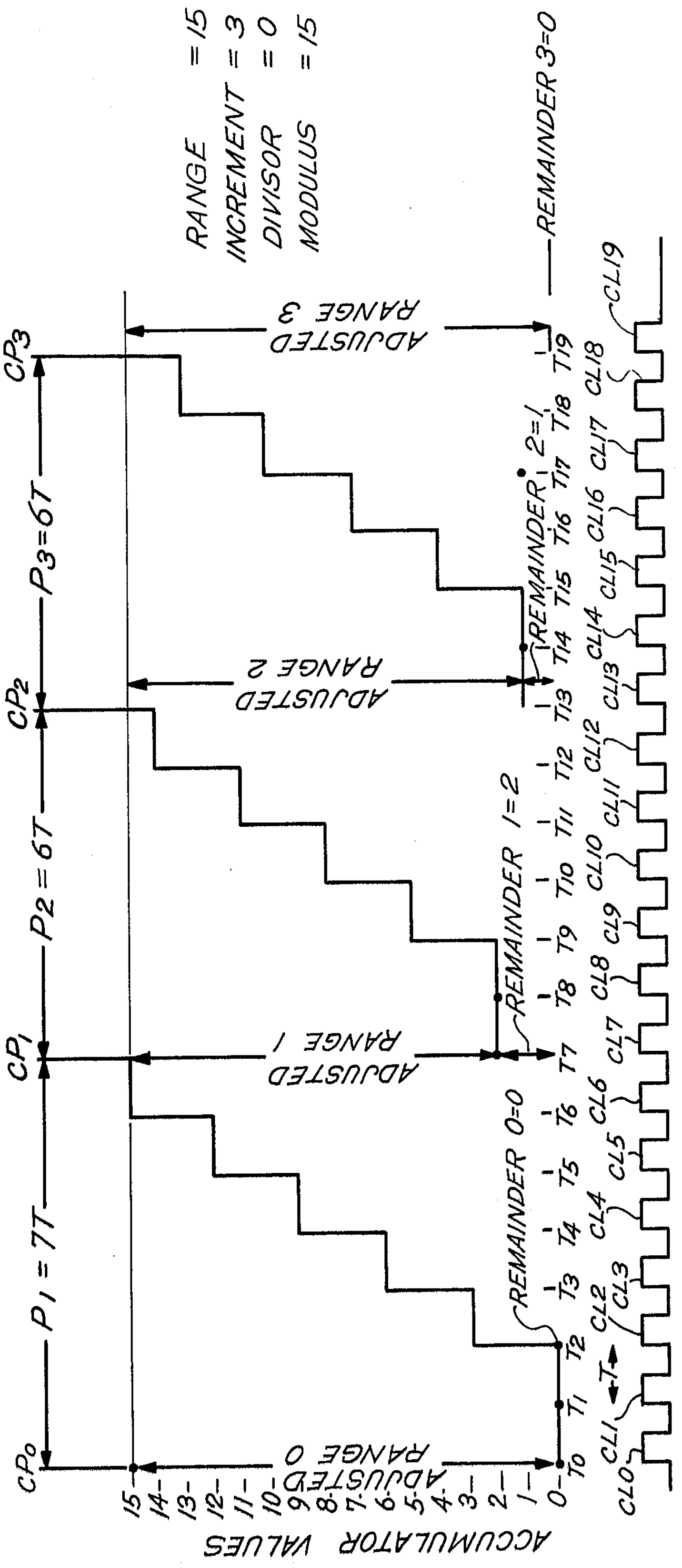
FIGS. 6 and 7 are timing diagrams showing two different modes of operation of the novel note oscillator shown in FIG. 2.

In FIG. 6, it is assumed that adder 44 is a 4-bit adder having a modulus of 15. It is also assumed that the increment number is 3 and the divisor number is zero, thereby establishing the range equal to the modulus. Individual clock pulses (CL1–CL19) are shown as waveform CL. The clock pulses have a period T and occur at times T0, T1, T2, etc. The vertical axis shows the values stored in accumulator 52 at various points in time. Assuming the initial remainder left in adder 44 is zero, the adjusted range for T0 equals 15. In addition, assuming that a carry pulse is generated at time T0, a logical one value is stored in latch 58. As a result, at time T0, a one is written into latch 58 and a zero value is written into latch 48 and accumulator memory 52. On the trailing edge of pulse CL0, in response to the logical one state of conductor 60, multiplexer 40 transmits the divisor number from register 32 to the AD input of adder 44. Since the values at inputs 80 and 82 are both zero, the zero sum is transmitted to latch 48 and is written into that latch and accumulator 52 in response to the leading edge of clock pulse CL1. Since there is no carry output from adder 44, in response to the trailing edge of clock pulse CL0, a zero state is written into latch 58 at time T1. In response to the zero signal on conductor 60, at the trailing edge of clock pulse CL1, multiplexer 40 transmits the increment number to the AD input of adder 44. Since the accumulator value at this point in time is zero, the sum from adder 44 is 3. The value of 3 is written into latch 48 and memory 52 in response to the rising edge of clock pulse CL2 at time T2. Since there is no carry pulse at this time, the value of latch 58 remains zero. In response to each clock pulse, the adder continues to increment the value in the accumulator memory by 3 until the modulus is equalled during clock pulse CL6. In response to the trailing edge of clock pulse CL6, the number 3 is added to the number 15 so that the modulus of the adder is exceeded and a carry pulse CP1 is generated. In response to this addition, a remainder of 2 is left in adder 44 and is transmitted from the S output to latch 48. As a result, the value of 2 is written into latch 48 and accumulator memory 52 in response to the leading edge of clock pulse CL7. Since a carry pulse is generated, the value of 1 is written into latch 58 at time T7. Writing the remainder of the adder into the accumulator memory at time T7 is an important feature which adjusts the range to the value of the remainder. This feature enables the preferred embodiment to generate a much wider range of carry pulse frequencies over much narrower increments than would otherwise be possible.

In response to the trailing edge of clock pulse CL7, the divisor number is added to the accumulator value and the sum is stored in the accumulator memory 52. In response to the trailing edge of clock pulse CL8, the adder again begins to increment the accumulator memory by the value of the increment number stored in register 34. This process continues as before until the modulus is exceeded and a carry pulse CP2 is generated in response to the trailing edge of clock pulse CL12. The remainder value remaining in the adder at time T13 is one, and this value is stored in accumulator memory 52 in response to the leading edge of clock pulse CL13. As a result, the range of the oscillator is again adjusted by the remainder value. The divisor number and increment numbers are then added to the accumulator memory in the sequence previously described until a carry pulse CP3 is generated in response to the trailing edge of clock pulse CL18. The remainder value in the adder at this point in time is zero, thereby completing the cycle of operation begun at time T0.

It should be noted that the period between carry pulses CP1, CP2 and the period between carry pulses CP2, CP3 both equal 6T, whereas the period between carry pulses CP0, CP1 equals 7T. Although at first glance this operation might appear to result in erroneous addressing of memory 100, it has been discovered that the difference in the time periods is not significant if an 8-bit adder is employed.

Figure 7:
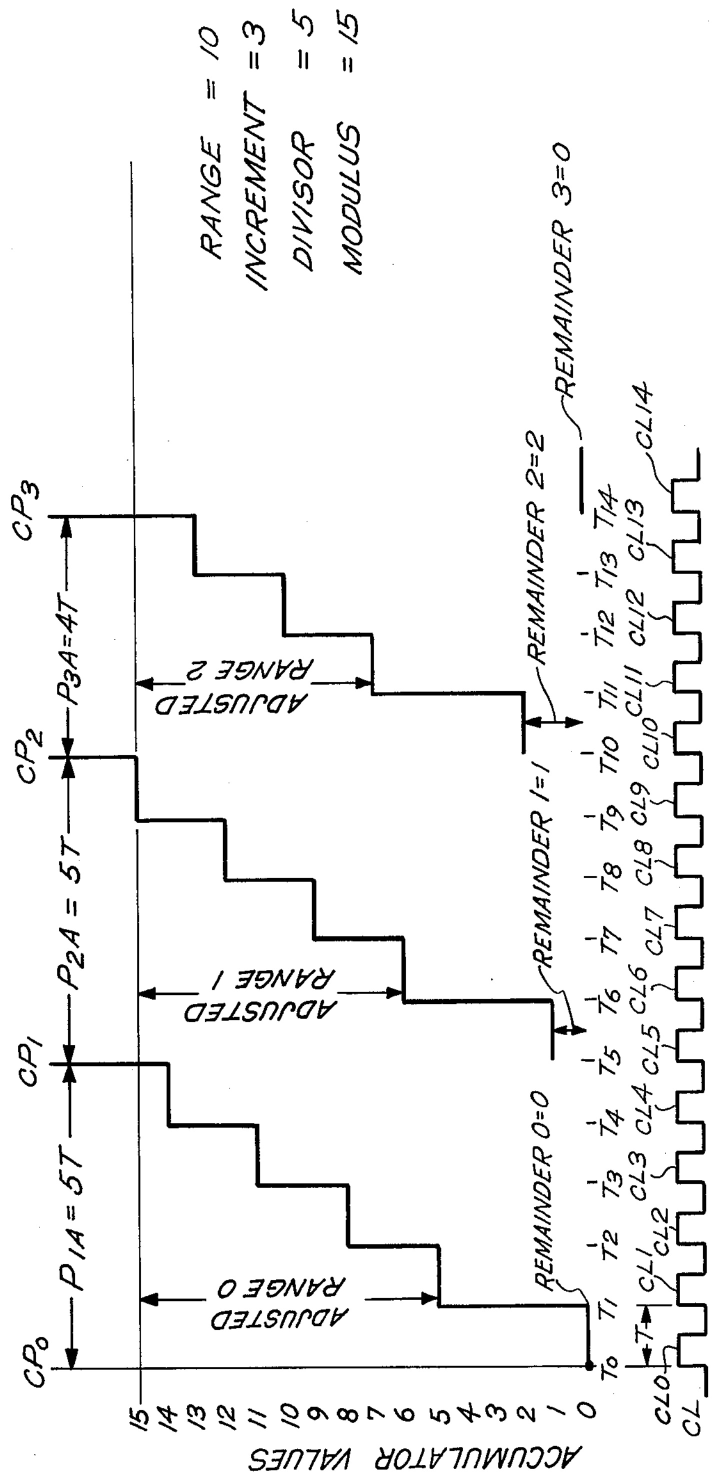

Referring to FIG. 7, it will be noted that the range of the oscillator can be altered by merely changing the value of the divisor number stored in register 32. In the example shown in FIG. 7, it is assumed that the divisor number is 5 and the increment number is 3. Since the divisor number is 5, the range is the modulus minus the divisor number or 10. Assuming a clock pulse is generated at time T0 and the remainder in adder 44 is zero, the value 1 is written into latch 58 and the value 0 is written into latch 48 on the leading edge of clock pulse CL0. In response to the trailing edge of clock pulse CL0, the divisor number (5) is added to the accumulator value (0) and the sum (5) is written into latch 48 at time T1. Since no carry pulse is produced at time T1, the value written into latch 58 is zero. In response to the next clock pulses, the value in the accumulator is incremented by the value of the increment number until the modulus of the adder is exceeded in response to the trailing edge of clock pulse CL4. At this point in time, the remainder in the adder is 1, and this value is written into latch 48 and accumulator member 52 at time T5. In response to the trailing edge of clock pulse CL5, the divisor number is added to the accumulator value (1) to adjust the range of the oscillator. Thereafter, the value in the accumulator is incremented by the increment number until the modulus of the adder is again exceeded in response to the trailing edge of clock pulse CL9. At time T10, the remainder 2 is written into latch 48 and accumulator memory 52. The divisor and increment numbers are added to the accumulator value in the sequence previously described until another carry pulse CP3 is produced just prior to time T14. At this time the remainder in adder 44 is zero and the cycle of operation is completed.

The ability of the oscillator to adjust the range according to the remainder left in adder 44 in response to each carry pulse is an important feature which enables the circuitry to produce carry pulses in a narrow increments of frequencies. In addition, the ability of the system to alter both the divisor and increment number drastically increases the number of frequencies of carry pulses which can be produced when compared with prior art systems. A typical spacing of frequency intervals for two different ranges of notes is shown in Table II:

TABLE II

| FREQUENCY | DIVISOR NO. | INCREMENT NO. |
|---|---|---|
| 246.972 | 82 | 7 |
| 247.25 | 117 | 10 |
| 247.4 | 152 | 13 |
| 247.493 | 187 | 16 |
| 247.9 | 35 | 3 |
| 485.964 | 71 | 13 |
| 486.49 | 60 | 11 |
| 487.253 | 49 | 9 |
| 487.778 | 87 | 16 |
| 488.456 | 38 | 7 |

Those skilled in the art will recognize that only two embodiments of the present invention have been described herein and these embodiments may be altered and modified without departing from the true spirit and scope of the invention as defined in the accompanying claims. For example, the multiplexers could be replaced by other logic gating arrangements and the digital memory can be sampled in response to less than all of the carry pulses. In a system for generating a limited number of discrete frequencies, the calculator could be implemented by a decoder memory.

What is claimed is:

1. A digital electronic musical instrument capable of producing notes in narrow, controllable frequency intervals comprising:

means for selecting a desired note having a fundamental frequency;

digital oscillator means for cyclically performing incrementing operations over a variable range at a variable increment, for generating a carry pulse and a remainder when the range is exceeded, and for readjusting the range in proportion to the remainder in response to each carry pulse;

digital calculator means responsive to said means for selecting which automatically calculates the values of the range and increment so that the repetition rate of the carry pulses is a multiple of the fundamental frequency; and means for producing the desired note in response to at least some of the carry pulses, whereby the pitch of the desired note can be modified by changing the relationship between the range and increment.

2. An instrument, as claimed in claim 1, wherein the oscillator means comprises means for decreasing the range by the value of the remainder.

3. An instrument, as claimed, in claim 2, wherein the oscillator means comprises means for decreasing the range by the value of the remainder before beginning each cycle of incrementing operations.

4. An instrument, as claimed in claim 1, wherein the remainder equals the value of the increment minus the difference between the accumulated value of the incrementing operations and the range immediately prior to the generation of the carry pulse.

5. An instrument, as claimed in claim 1, wherein the oscillator means comprises:

clock means for generating clock pulses at a predetermined clock rate;

adder means having a modulus for performing addition operations to form sums and for generating a carry pulse and remainder when the results of any addition operation exceeds the modulus;

means for storing an increment number proportional to the variable increment and for storing a divisor number proportional to the difference between the modulus and the range;

accumulator means for storing the sums and remainder produced by the adder means;

control means for enabling the adder means to add the increment number of the sum in response to each clock pulse until the carry pulse is generated and to add the resulting remainder to the divisor number for one addition operation following each carry pulse;

and wherein the calculator means comprises means for calculating the values of the increment and divisor numbers and for transmitting the numbers to the means for storing.

6. An instrument, as claimed in claim 5, wherein the means for storing comprises:

first digital register means for storing the divisor number; and second digital register means for storing the increment number.

7. An instrument, as claimed in claim 6, wherein the calculator means comprises means for solving the equation $F = CR\ [(I/(1+B-D)]$ where $F$ equals an even multiple of the desired note frequency, $CR$ equals the predetermined clock rate, $I$ equals the increment number, $B$ equals the modulus and $D$ equals the divisor number.

8. An instrument, as claimed in claim 6, wherein the clock pulse is 400 kilohertz or less, the modulus is 8 bits or less, the increment number is 16 or less and the divisor number is 256 or less.

9. An instrument, as claimed in claim 6, wherein the control means comprises gate means for normally transmitting the increment number to the adder means and for substituting the divisor number in place of the increment number for transmission to the adder means in response to each carry pulse.

10. An instrument, as claimed in claim 9, wherein the means for producing the desired note comprises:

waveshape means for storing a digital representation of a periodic waveshape, the amplitude of the waveshape being digitally represented at a plurality of addresses, each address representing a phase angle of the periodic waveshape;

means for sampling the waveshape at a different address in response to at least some of the carry pulses; and means for converting the results of the sampling into tone signals.

11. Apparatus for producing tone signals at desired repetition rates, said tone signals being suitable for conversion to audible notes comprising:

digital oscillator means for cyclically performing incrementing operations over a variable range at a variable increment, for generating a carry pulse and a remainder when the range is exceeded, and for readjusting the range in proportion to the remainder in response to each carry pulse;

means for producing tone signals in response to at least some of the carry pulses; and digital calculator means for automatically determining the proper values of the range and increment, so that the carry pulses are generated at a desired rate, whereby the repetition rate of the carry pulses can be altered by changing the relationship between the range and increment.

12. Apparatus, as claimed in claim 11, wherein the oscillator means comprises means for decreasing the range by the value of the remainder.

13. Apparatus, as claimed in claim 12, wherein the oscillator means comprises means for decreasing the range by the value of the remainder before beginning each cycle of incrementing operations.

14. Apparatus, as claimed in claim 11, wherein the remainder equals the value of the increment minus the difference between the accumulated value of the incrementing operations and the range immediately prior to the generation of the carry pulse.

15. Apparatus, as claimed in claim 11, wherein the oscillator means comprises:

clock means for generating clock pulses at a predetermined clock rate;

adder means having a modulus for performing addition operation to form sums and for generating a carry pulse and remainder when the results of any addition operation exceeds the modulus;

means for storing an increment number proportional to the variable increment and for storing a divisor number proportional to the difference between the modulus and the range;

accumulator means for storing the sums and remainder produced by the adder means;

control means for enabling the adder means to add the increment number to the sum in response to each clock pulse until the carry pulse is generated and to add the resulting remainder to the divisor number for one addition operation following each carry pulse;

and wherein the calculator means comprises means for calculating the values of the increment and divisor numbers and for transmitting the numbers to the means for storing.

16. Apparatus, as claimed in claim 15, wherein the means for storing comprises:

first digital register means for storing the divisor number; and second digital register means for storing the increment number.

17. Apparatus, as claimed in claim 16, wherein the calculator means comprises means for solving the equation $F = CR\ [I/(1+B-D)]$ where $F$ equals an even multiple of the desired note frequency, $CR$ equals the predetermined clock rate, $I$ equals the increment number, $B$ equals the modulus and $D$ equals the divisor number.

18. Apparatus, as claimed in claim 16, wherein the clock rate is 400 kilohertz or less, the modulus is 8 bits or less, the increment number is 16 or less and the divisor number is 256 or less.

19. Apparatus, as claimed in claim 16, wherein the control means comprises gate means for normally transmitting the increment number to the adder means and for substituting the divisor number in place of the increment number for transmission to the adder means in response to each carry pulse.

20. Apparatus, as claimed in claim 19, wherein the means for producing tone signals comprises:

waveshape means for storing a digital representation of a periodic waveshape, the amplitude of the waveshape being digitally represented at a plurality of addresses, each address representing a phase angle of the periodic waveshape;

means for sampling the waveshape at a different address in response to at least some of the carry pulses; and means for converting the results of the sampling into tone signals.

21. A process for producing musical notes at preselectable repetition rates which can be varied over narrow intervals comprising the steps of:

selecting a desired note having a predetermined fundamental frequency;

cyclically performing incrementing operations over a variable range at a variable increment;

generating a carry pulse and a remainder when the range is exceeded;

readjusting the range in proportion to the remainder in response to each carry pulse;

calculating the proper values of the range and increment so that the carry pulses are generated with a repetition rate having a predetermined relationship to the predetermined fundamental frequency; and producing the desired note in response to at least some of the carry pulses, whereby the pitch of the desired note can be changed by altering the relationship of the range and increment.

22. A process, as claimed in claim 21, wherein the step of decreasing the range comprises the step of decreasing the range by the value of the remainder.

23. A process, as claimed in claim 22, wherein the step of decreasing the range comprises the step of decreasing the range by the value of the remainder before beginning each cycle of incrementing operations.

24. A process, as claimed in claim 22, wherein the remainder equals the value of the increment minus the difference between the accumulated value of the incrementing operations and the range immediately prior to the generation of the carry pulse.

* * * * *